United States Patent [19]

Yokoyama et al.

[11] Patent Number: 5,343,399
[45] Date of Patent: Aug. 30, 1994

[54] VEHICLE NAVIGATION SYSTEM

[75] Inventors: Shoji Yokoyama, Anjo; Kyomi Morimoto, Nishio; Akimasa Nanba; Kiyohide Katoh, both of Chiryu; Kenji Kuroda, Sabae; Hiroshi Kishi, Toyota; Toru Ito, Nagoya, all of Japan

[73] Assignee: Aisin Aw Co., Ltd., Anjo, Japan

[21] Appl. No.: 95,440

[22] Filed: Jul. 23, 1993

[30] Foreign Application Priority Data

| Jul. 23, 1992 | [JP] | Japan | 4-195779 |
| Jul. 31, 1992 | [JP] | Japan | 4-204598 |
| Jul. 31, 1992 | [JP] | Japan | 4-204697 |
| Aug. 19, 1992 | [JP] | Japan | 4-220116 |

[51] Int. Cl.$^5$ .............................. G06F 15/50
[52] U.S. Cl. ........................ 364/449; 364/444; 340/990; 340/995
[58] Field of Search ............... 364/443, 444, 449; 73/178 R; 340/988, 990, 995

[56] References Cited

U.S. PATENT DOCUMENTS

| 4,812,845 | 3/1989 | Yamada et al. | 364/449 |
| 4,882,696 | 11/1989 | Nimura et al. | 364/444 |
| 4,937,751 | 6/1990 | Nimura et al. | 364/449 |
| 4,939,662 | 7/1990 | Nimura et al. | 364/449 |
| 5,043,902 | 8/1991 | Yokoyama et al. | 340/995 |

FOREIGN PATENT DOCUMENTS

| 62-267900 | 11/1987 | Japan . |
| 1173815 | 7/1989 | Japan . |
| 1173817 | 7/1989 | Japan . |
| 3173819 | 7/1989 | Japan . |
| 24285 | 1/1990 | Japan . |
| 2103584 | 4/1990 | Japan . |
| 3137679 | 6/1991 | Japan . |
| 3269317 | 11/1991 | Japan . |

Primary Examiner—Gary Chin
Attorney, Agent, or Firm—Cushman, Darby & Cushman

[57] ABSTRACT

In a vehicle navigation system, when a voice control part, which is displayed on a screen, is switched off, a voice control part inhibits voice guidance from being output to a speaker. Now, if a current-location/guide selection key is operated, the voice control part creates voice guidance according to the operation of the selection key and outputs the voice guidance from the speaker. With this navigation system, aural route guiding is possible only at the driver's request.

4 Claims, 14 Drawing Sheets

VEHICLE NAVIGATION SYSTEM

BACKGROUND OF THE INVENTION

1. Field of the Invention

This invention relates to a vehicle navigation system for aurally directing the movement of a vehicle so that it will reach its intended destination.

2. Description of the Related Art

Various kinds of apparatuses have been developed for use on vehicles in an effort to reduce the driver's burden; among such conventional apparatuses, there is a navigation system for directing the movement of a vehicle so that it will reach its intended destination. The conventional navigation system is equipped with the function of showing the driver a route to be selected when the vehicle passes a turning point such as a crossing and of directing the route aurally. This conventional navigation system is exemplified by Japanese Patent Laid-Open Publication No. HEI 1-173819.

With the conventional navigation system using aural guidance, notice as to whether a vehicle should turn to the right or left is automatically given to the driver aurally when the vehicle arrives at a crossing, as the current position of the running vehicle is detected at all times. For instance, aural guidance such as "turn to the left at the crossing 100 m ahead" is given when the vehicle arrives at a position 100 m short of the crossing.

Therefore, even in the absence of local map knowledge, the driver can take a correct driving route, without watching the display of the system.

Assuming that the vehicle is traveling on a road the driver knows somewhat, an aural notice would not be necessary, instead, the route will have been searched as a matter of precaution. Any display on the screen will not disturb the driver if he/she does not look at the screen, but an aural notice will reach the driver's ears whether they like it or not. As a hypothetical solution, such an aural notice could be cut off by means of a switch so that no announcement disturbs the driver.

If route searching is being made when traveling, it may be that the driver requires some help with the navigation. Practically, route guiding on the display screen is more difficult to follow, compared to route guiding aurally. It is therefore preferable that the driver could enjoy aural route guiding only, at the driver's request.

SUMMARY OF THE INVENTION

It is therefore an object of this invention to provide a vehicle navigation system which can give timely voice guidance at the driver's request.

According to this invention, there is provided a vehicle navigation system comprising: map information storage means; route computing means for searching for a route to an intended destination of the vehicle using the map information stored in the map information storage means; route guide and control means for displaying the computed route on a display screen and for outputting voice guidance via a speaker; on-off selecting means for selecting whether or not the voice guidance should be output; inhibition means for inhibiting outputting of the voice guidance if the on-off selecting means selects that the voice guidance should not be output; input means for inputting a request for outputting the voice guidance; voice guidance creating means for creating the voice guidance in response to the output request from the input means; and voice guidance voice output means for releasing the inhibition status of the inhibition means for a predetermined period of time to output the voice guidance created by the voice guidance creating means.

With this arrangement, if the driver makes a request while voice guidance is inhibited (usually, route guidance is displayed on the screen), it is possible to output voice guidance. Therefore, the driver will not be disturbed by any voice guidance unless he/she makes a request; that is, the driver can uninhibit voice guidance if he/she wishes to hear such voice guidance. Thus it is possible to give suitable voice guidance to meet the driver's request.

DETAILED DESCRIPTION

Preferred embodiments of this invention will now be described with reference to the accompanying drawings.

First Embodiment

Figure 1:
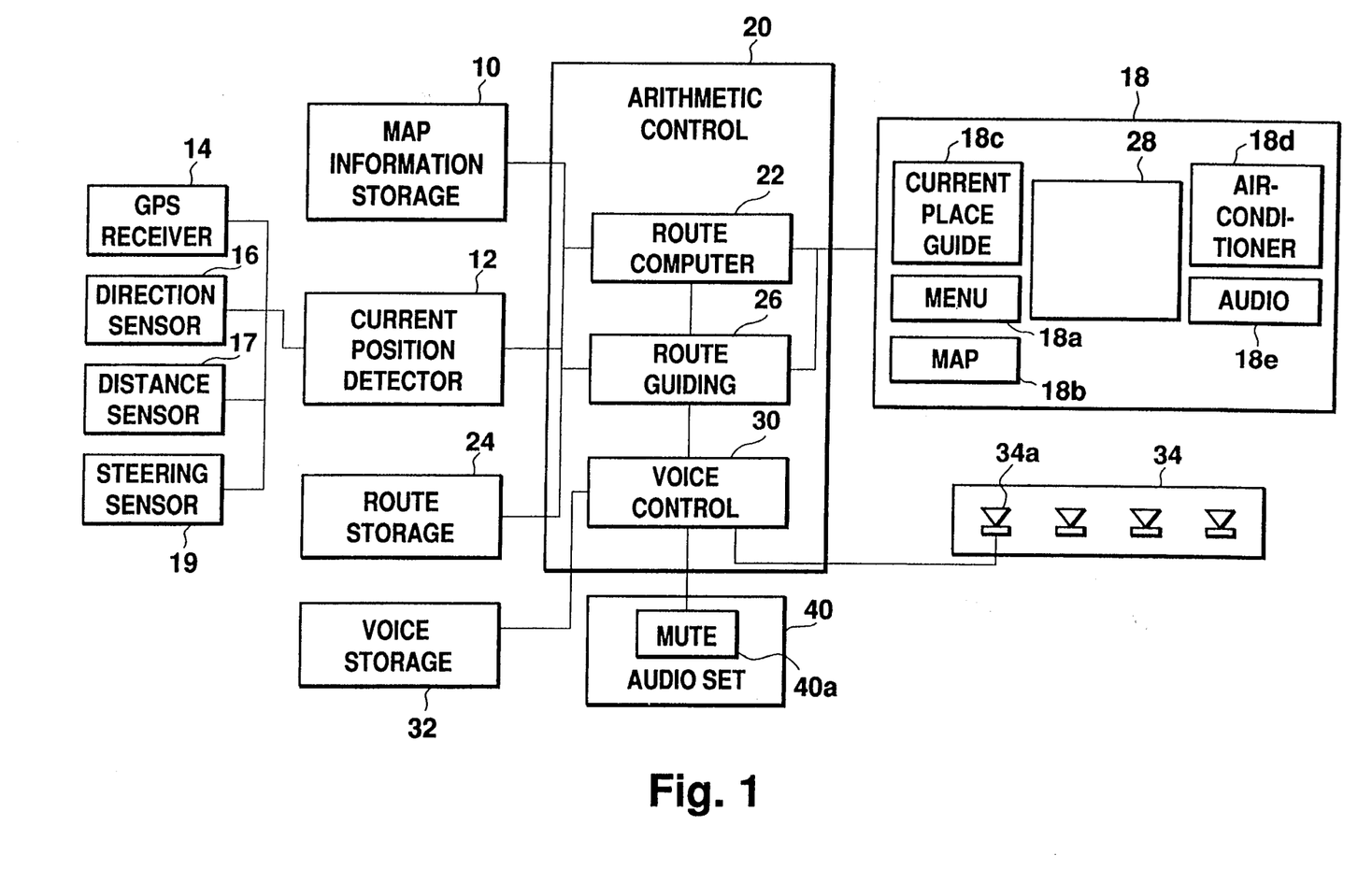
FIG. 1 is a block diagram showing a vehicle navigation system according to a first embodiment of this invention.

FIG. 1 is a block diagram showing a vehicle navigation system according to a first embodiment of this invention. The navigation system includes a map information storage unit 10 in which map information, such as road names, place names (crossing names), building names and river names, is stored and from which the stored map information may be read as required. The navigation system also includes a GPS receiver 14 utilizing the global positioning system (hereinafter called "GPS") for measuring the current position of a vehicle, a direction sensor 16 for detecting the direction of movement of the vehicle based on the earth's magnetism, and a distance sensor 17 for detecting the distance covered in terms of r.p.m. of the wheels. Based on the results of detection of these sensors, a current position measuring unit 12 locates the current position of the vehicle. Information from a steering sensor 19 is utilized such as in map matching to compensate the current position of the vehicle to the position of a crossing on a map when the vehicle turns to the right or left at the crossing.

For guiding the vehicle to its intended destination, the destination is indicated on the screen of a display unit described below and is input by place name, and the route from the current position, which is computed by the current position measuring unit 12, to the destination is computed by a route computing unit 22 having an arithmetic control unit 20, whereupon the computed route is stored in a route storage unit 24. In this route computing, any suitable route searching method may be used.

A destination is input and then a route is decided, whereupon actual route guidance takes place. A route guiding unit 26 of the arithmetic control unit 20 reads map information around the vehicle from the map information storage unit 10 and indicates this on a display unit 28, superposed with the current position and direction of movement of the vehicle as well as the route stored in the route storage unit 24.

Figure 2:
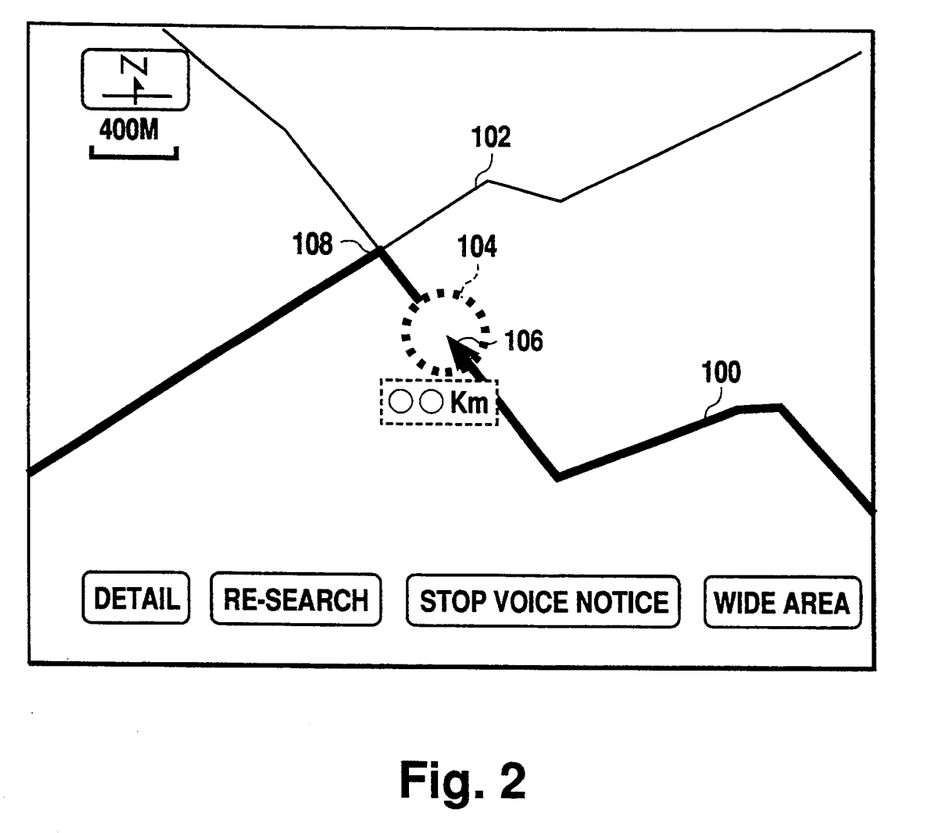
FIG. 2 is a diagram showing an example of displayed route guidance.

The display unit 28 is mounted in an instrument panel near the driver's seat so that the driver can confirm the current position of the vehicle by watching the display unit 28 and can obtain information about a future route. One example of such a display is shown in FIG. 2. In FIG. 2, the selected route is indicated by a thick solid line 100 and the remaining roads are indicated by thin solid lines 102. The current position of the vehicle is indicated by a circle 104, and the direction of movement is indicated by an arrow 106. Roads may be indicated by either solid lines of different thicknesses or different colors.

Figure 3:
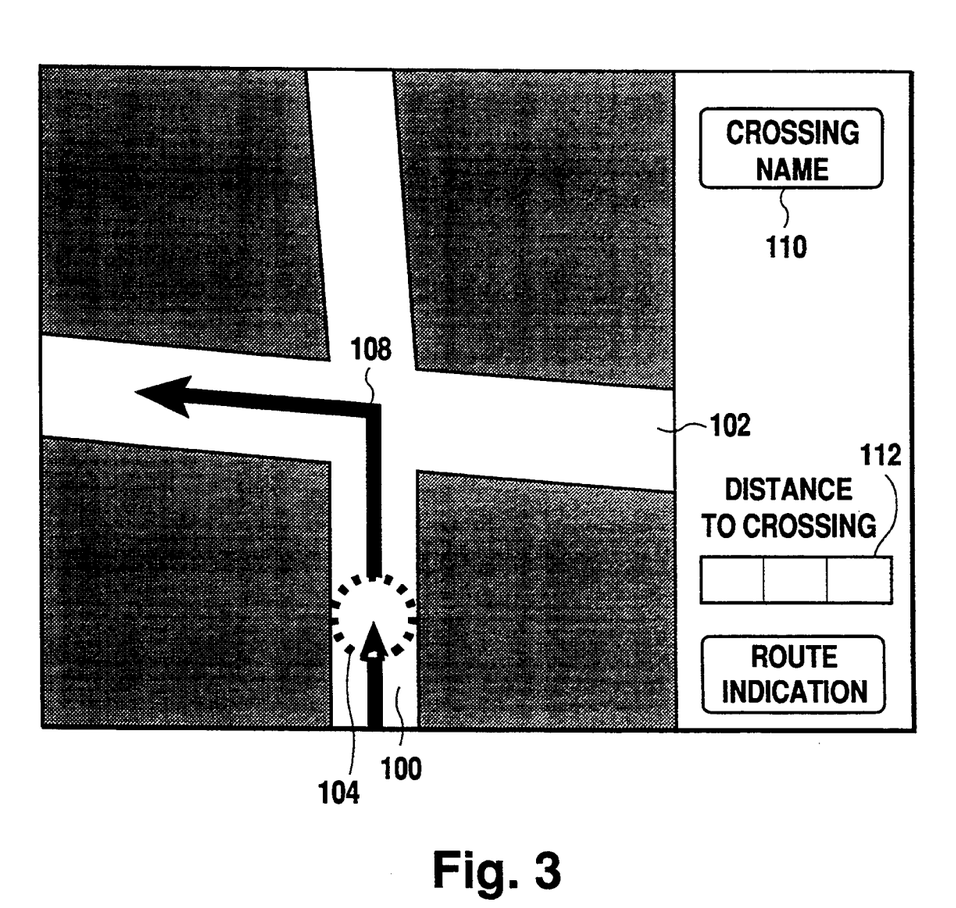
FIG. 3 is a diagram showing another example of displayed route guidance around a crossing.

When the vehicle approaches a crossing 108, where the vehicle has to make a turn, the display on the screen is switched to that of FIG. 3, and the crossing name 110 and the distance 112 to the crossing are displayed on the screen. The route guiding unit 26 instructs a voice control unit 30 in the form of an amplifier to generate a voice corresponding to the route guidance at the crossing simultaneously with this change of display. The voice control unit 30 reads from a voice storage unit 32 information stored therein as digital data, and the digital data is converted into analog signals to activate a speaker 34. A route direction, for example, "Turn to the left at * * * crossing about 300 m ahead." is issued to the driver from the speaker 34 to perform the route guidance. This voice direction is given for every predetermined distance until the vehicle has passed the crossing. Assuming that the vehicle is traveling on a road having two or more lanes, a first aural notice is given at a position 700 m short of the crossing, a second notice is given at a position 300 m short of the crossing, a final notice at a position 100 m short of the crossing. These guidance voices are stored in the voice storage unit 32 in terms of digital data for every phrase. For outputting voice guidance, several phrases are read from the storage unit 32 to create a composite guidance signal to be output from the speaker 34. The timing to output voice guidance is detected by the route guiding unit 26, and the voice control unit 30 makes the process for voice output.

In this embodiment, the screen of the display unit 28 is constituted by a touch-sensitive panel serving as an input unit 18. The driver can make a data input by touching the place name indicated on the display unit 28. The input unit 18 includes a menu key 18a for going back to a menu screen to select a process such as inputting the destination or controlling the voice, a current-position/guide key 18c for going back to a current-position indicating screen or requesting route guidance, an air-conditioner key 18d for displaying an air-conditioner control screen, an audio key 18e for displaying an audio control screen, etc.

Further, a voice notice is output using the speaker 34 of an audio set. Specifically, out of four speakers of the audio set, one speaker (i.e., a speaker 34a near the driver's seat) is used to output voice guidance. For this purpose, the speaker 34a near the driver's seat is connected to the audio set 40 via the voice control unit 30, and the output of the audio set 40 is connected to the remaining three speakers 34. When it is not necessary to output any voice guidance, the voice control unit 30 supplies the output from the audio set 40 to the speaker 34a. When it is necessary to output voice guidance, the voice control unit 30 supplies a voice guidance signal, instead of the output from the audio set 40, to the speaker 34a. As a result, the output of the audio set 40 is prohibited, and the voice guidance is output from the speaker 34a. The three speakers 34 other than the speaker 34a are not influenced by the voice guidance output.

Figure 4:
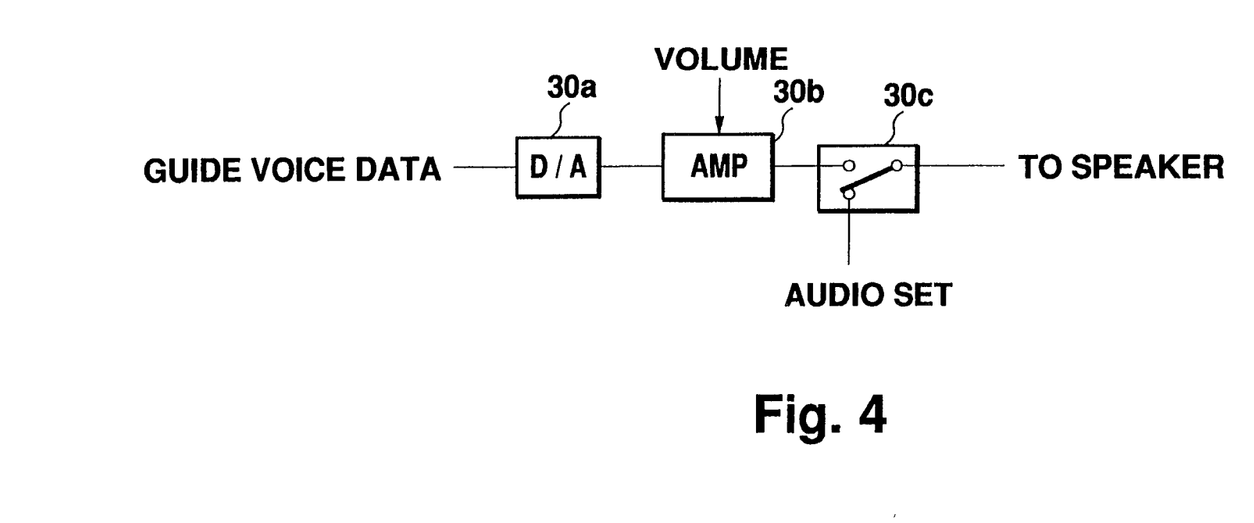
FIG. 4 is a block diagram showing the manner in which voice guidance is output from a voice control unit of the system.

FIG. 4 shows the manner in which voice guidance is output from the voice control unit 30. Digital voice data read from the voice storage unit 32 is stored in a RAM (not shown) and is processed such as by phrase composition, whereupon the resulting data is supplied to a digital-analog converter 30a where it is converted into an analog voice signal. The analog voice signal is then amplified, by an amplifier 30b, to a predetermined value specified by a volume signal and is supplied to a switch 30c.

The switch 30c supplies an audio signal or voice guidance from the voice control unit 30, one at a time, to the speaker 34a. Normally, the switch 30c supplies an audio signal to the speaker 34a. Only when voice guidance is to be output, the switch 30c selects the signal from the amplifier 30b. This switching is made by the voice control unit 30, based on the signal from the route guiding unit 26.

Volume control of the voice guidance is determined by touching a volume control indication on the menu screen of the display unit 28. The menu screen of the display unit 28 is exemplified by those of FIGS. 5A and 5B. The voice control indication is seen at the bottom of the menu screen. When the indication "OFF" is touched, the attenuation factor of the volume signal will be 128 dB to stop voice guidance. If the "OFF" key is touched on this screen, the voice control unit 30 holds the switch 30c connected to the audio set so that the switch 30c is not operated even when it receives a switching control signal at the timing of guidance output from the route guiding unit 26, thus stopping any voice guidance output.

Now, if the current-position/guide key 18c is touched, the screen is changed to the route guiding screens of FIGS. 2 and 3 so that route guidance takes place by the screen. However, since the voice guidance is prohibited as the switch is held, no guidance will be output. During this voiceless route guiding, if the current-position/guide key 18c is touched, it will be regarded as a request for voice guidance. In response to this request, the voice guidance will be output. This operation will now be described in connection with FIG. 6.

Figure 6:
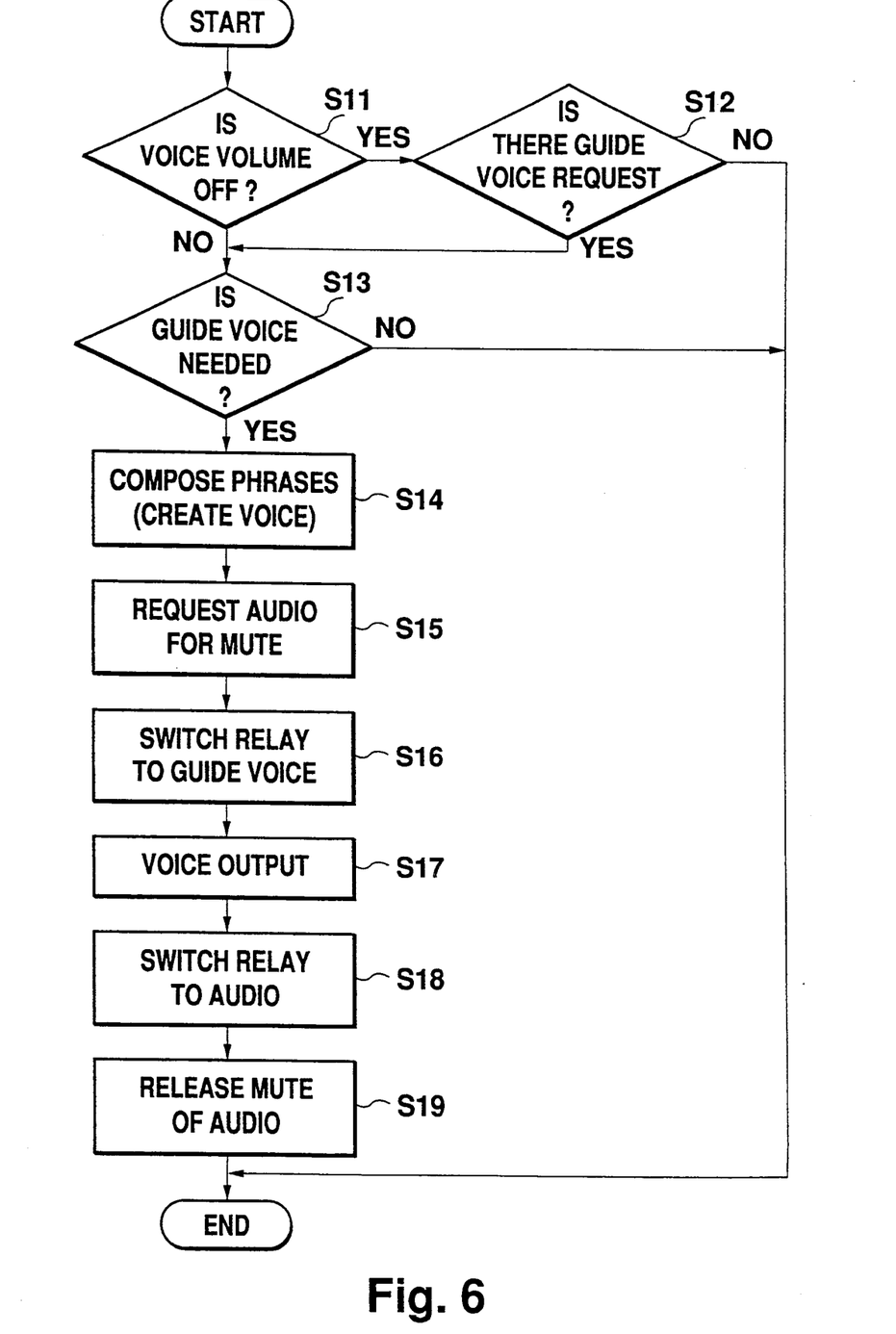
FIG. 6 is a flow diagram showing a process of navigation when a request for voice guidance is made.

It is determined whether the voice volume is set to be off (S11). If the voice volume is off, it is determined whether or not a request for voice guidance has been made, namely, whether the current-position/guide key on the menu screen has been touched (S12). If the current-position/guide key has not been touched, there is no request for voice guidance and so the process for outputting voice guidance will not be made.

At S11, if the voice volume is not off (i.e., if the normal voice guidance is to be made) and if a request for voice guidance has been made, it is confirmed whether or not the voice guidance is necessary (S13). In other words, if route guidance has not originally been made and if only the current position of the vehicle is displayed, then the process for outputting voice guidance will not be made.

If the voice guiding process is to be made during route searching, voice guidance phrases are composed. Namely, phrases stored in the voice storage unit 30 are combined to create a voice guidance signal. The normal voice guidance takes place when the vehicle reaches a predetermined position 300 m short of a crossing where the vehicle is to make a turn. But this guidance should take place at a timing different from the timing of the normal voice guidance. Specifically, guidance will take place when the driver has touches the current-position/guide key. The contents of the guidance depends on the situation. For example, if the vehicle reaches a position 500 m short of the crossing where the vehicle is to make a turn, the notice "Turn to the left at * * * crossing about 500 m ahead." is given. If the vehicle is traveling near a crossing where the vehicle is to pass, a notice such as "Passing near * * * crossing." is given. Thus phrases will be composed to create an appropriate notice.

Then the voice control 30 sends an activation signal to a mute circuit 40a of the audio set 40 to mute the output of the audio set 40 (S15). Then the switch 30a is operated to select the voice guidance (S16), and voice guidance is output from the speaker 32a (S17). Then the switch 30a is further operated to select connection to the audio set 40 (S18) so that the muting of the audio set 40 will be released (S19) to finalize the navigation process.

According to this embodiment, if the current-position/guide key 18c is touched while voice guidance is inhibited, it will be regarded as a voice guidance request having been made at the current position of the vehicle, whereupon voice guidance will be output. Therefore, this navigation system is particularly useful when the driver is to be guided only when required while traveling along a road the driver knows fairly well.

Figure 7:
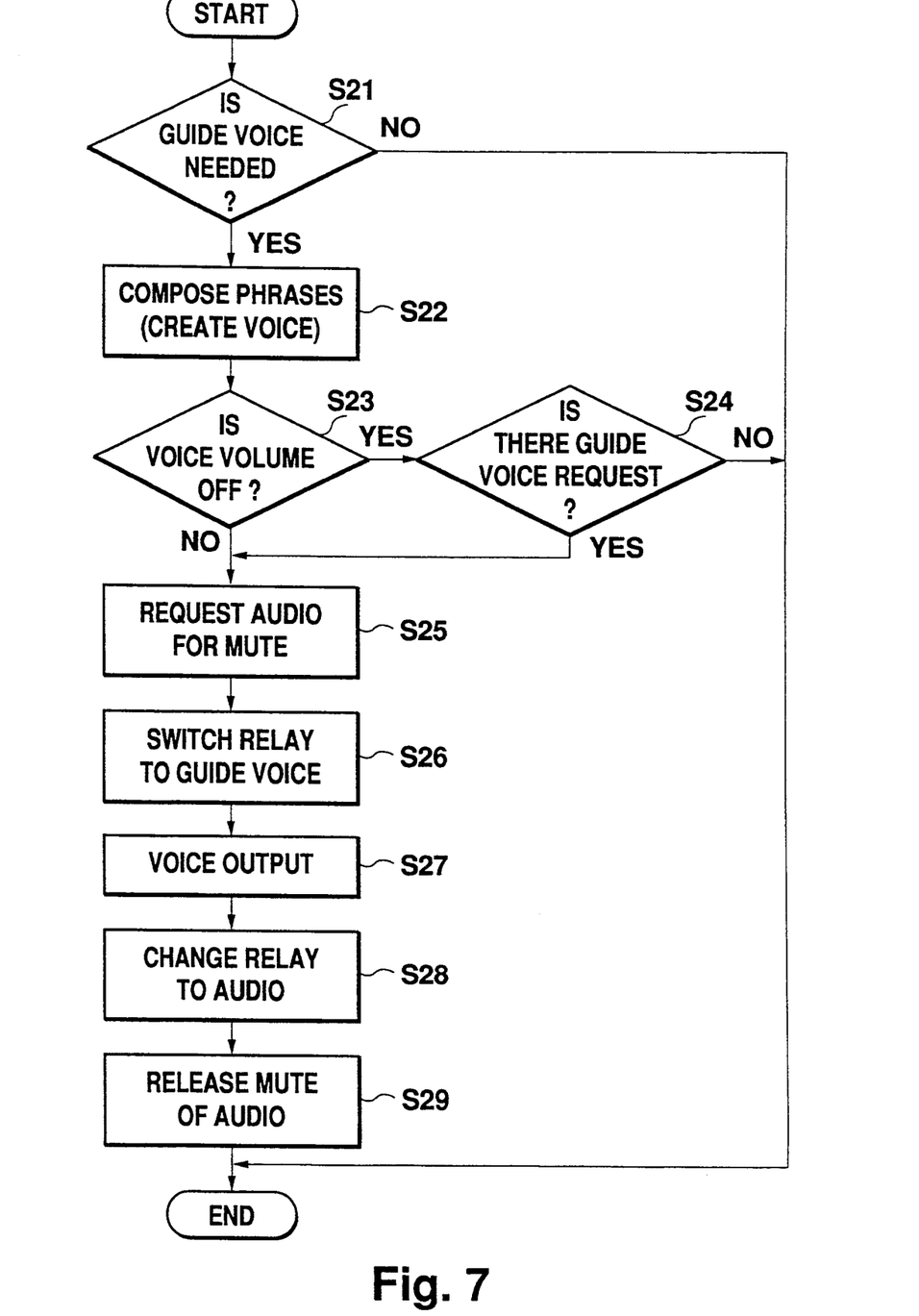
FIG. 7 is a flow diagram showing another process of navigation when a request for voice guidance is made.

FIG. 7 shows another navigation process, which is basically identical with that of FIG. 6. In this example, it is first determined whether or not a voice notice is necessary (S21). If the voice notice is necessary, phrases are composed (S22). For route guidance, voice notices are previously created to correspond to the various possible routes of the vehicle. Then it is determined whether or not the voice volume is off (S23). If the voice volume is off, it is determined whether or not a request for voice guidance has been made (S24). If the voice volume is not off and a voice guidance request has been made, a voice notice will be output. The process for voice guidance output S25–S29 is identical with that of S15–S19.

Figure 5A:
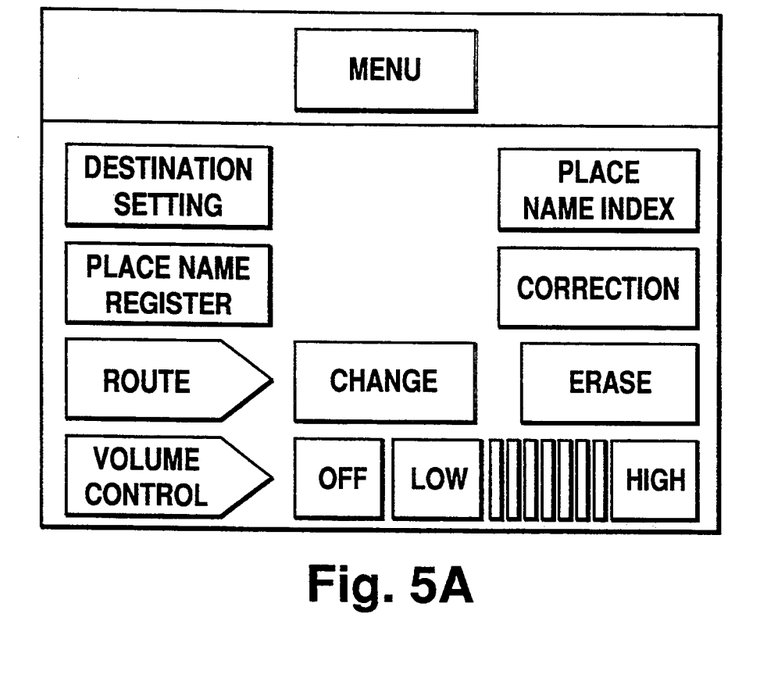
FIG. 5A is a diagram showing a voice control display on the menu screen.
Figure 5B:
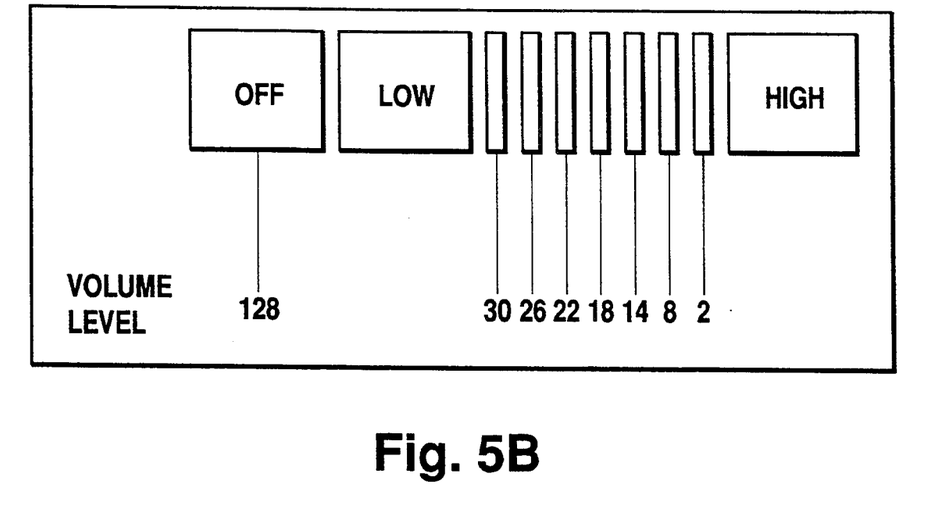
FIG. 5B is a diagram showing another voice control display on the menu screen.

By touching the indication "SMALL" on the menu screen, it is possible to increase the amount of attenuation of the amplifier 30b by a predetermined increment at every touch. Conversely, by touching the indication "Large" on the menu screen, it is then possible to reduce the amount of attenuation of the amplifier 30b by a predetermined decrement at every touch.

If the menu key 18a is depressed, it is possible to display the menu screen immediately so that voice guidance may be inhibited.

Second Embodiment

Figure 8:
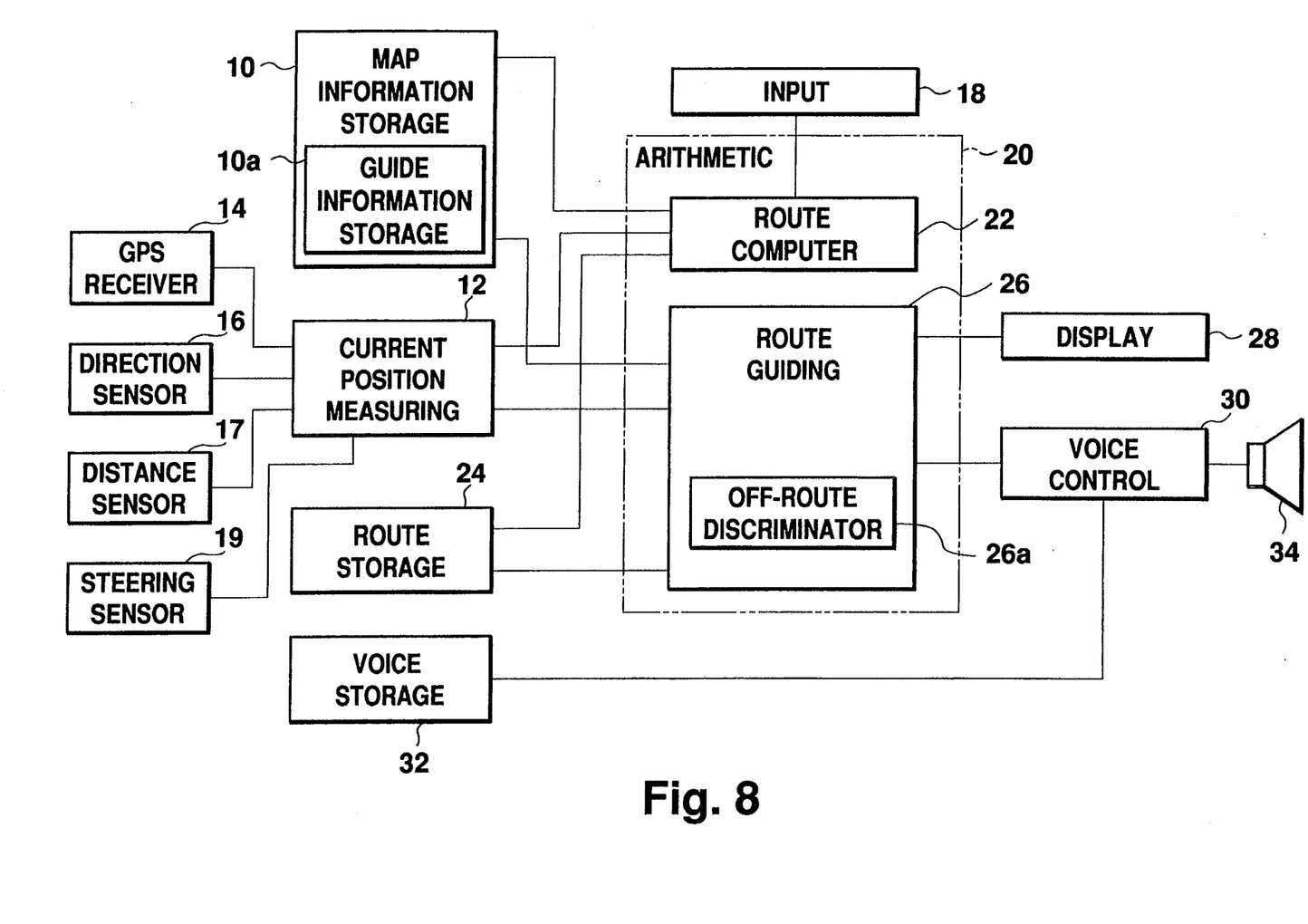
FIG. 8 is a block diagram showing a modified navigation system according to a second embodiment of the invention.

FIG. 8 shows a modified navigation system according to a second embodiment. In this embodiment, an off-route discriminator 26a is mounted in the route guiding unit 26. When the driver stops at a fuel station or a shop alongside the road, the current position of the vehicle will necessarily be off a scheduled route. Then the off-route discriminator 26a of the route guiding unit 26 recognizes that the current position of the vehicle is off the route as the result of comparison therebetween. In such an event, a control signal will be supplied to the voice control unit 30 to stop unnecessary voice guidance.

Figure 9:
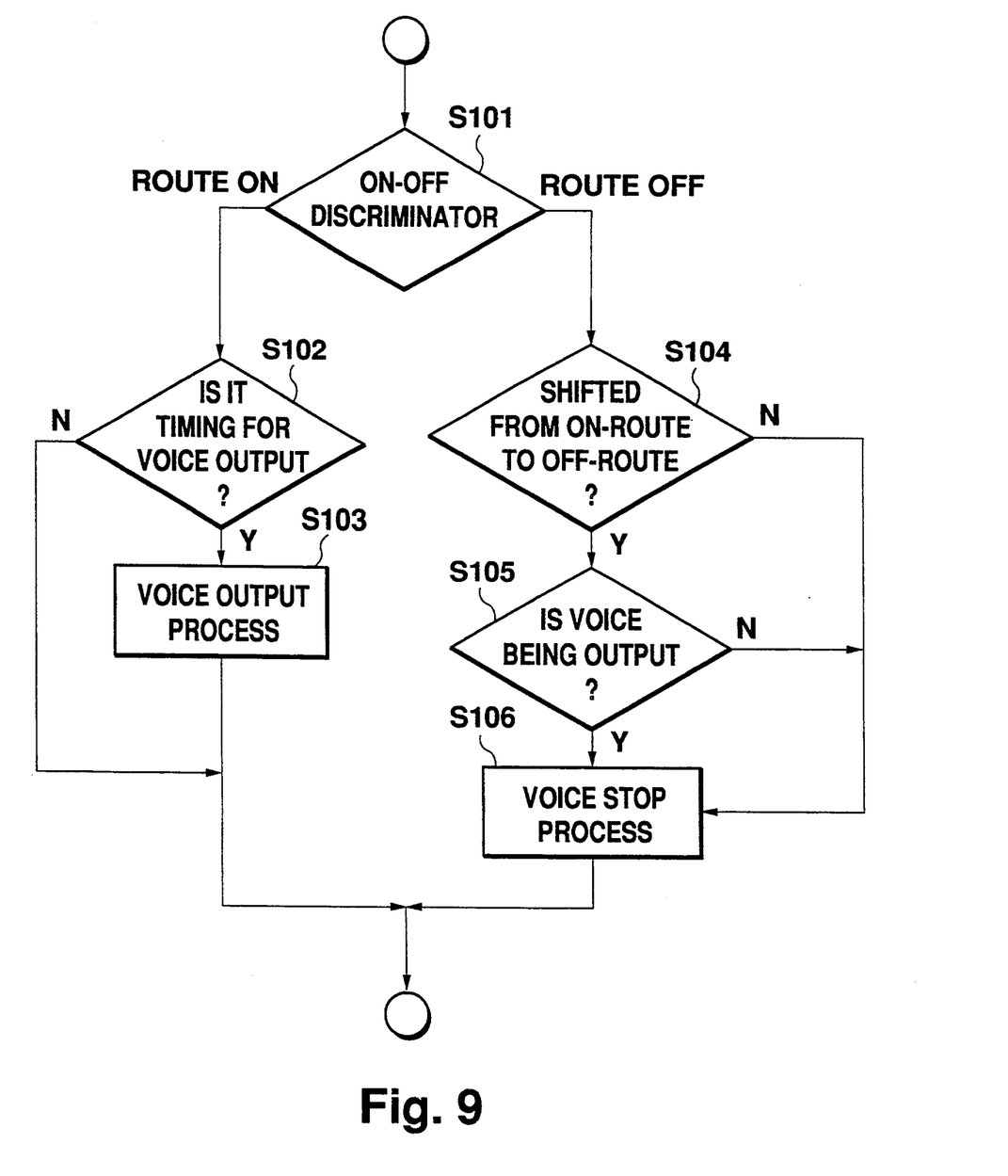
FIG. 9 is a flow diagram showing the navigation process of the second embodiment.

FIG. 9 is a flow diagram showing the operation of the route guiding unit 26 and the voice control unit 30. First of all, it is determined whether or not the current position of the vehicle is on a scheduled route (S101). This discrimination is made by the off-route discriminator 26a which compares the current position of the vehicle with the scheduled route. If the vehicle is on the route, it is determined whether or not voice guidance is necessary (S102). If voice guiding is necessary, the voice control unit 30 is instructed to perform the above-described voice guiding process (S103).

If the current position of the vehicle is not on the route and hence off the route, it is discriminated whether or not the vehicle has moved from an on-route position to an off-route position (S104). This discrimination is made by detecting the value of a flag which is raised depending on the result of the above-mentioned discrimination. If the off-route state has been detected, it is discriminated whether or not voice guidance is being output (S105). If unnecessary voice guidance is being output, the voice control unit 30 is instructed to stop voice guidance (S106).

In this embodiment, it is discriminated whether or not the vehicle has moved off the route. When the off-route state has been detected, voice guidance will be stopped as it is not necessary. Also when the driver has moved the vehicle voluntarily to an off-route position, no unnecessary voice will be output from the speaker so that the driver will not be disturbed by such unnecessary utterances and can enjoy comfortable travelling.

Third Embodiment

Figure 10:
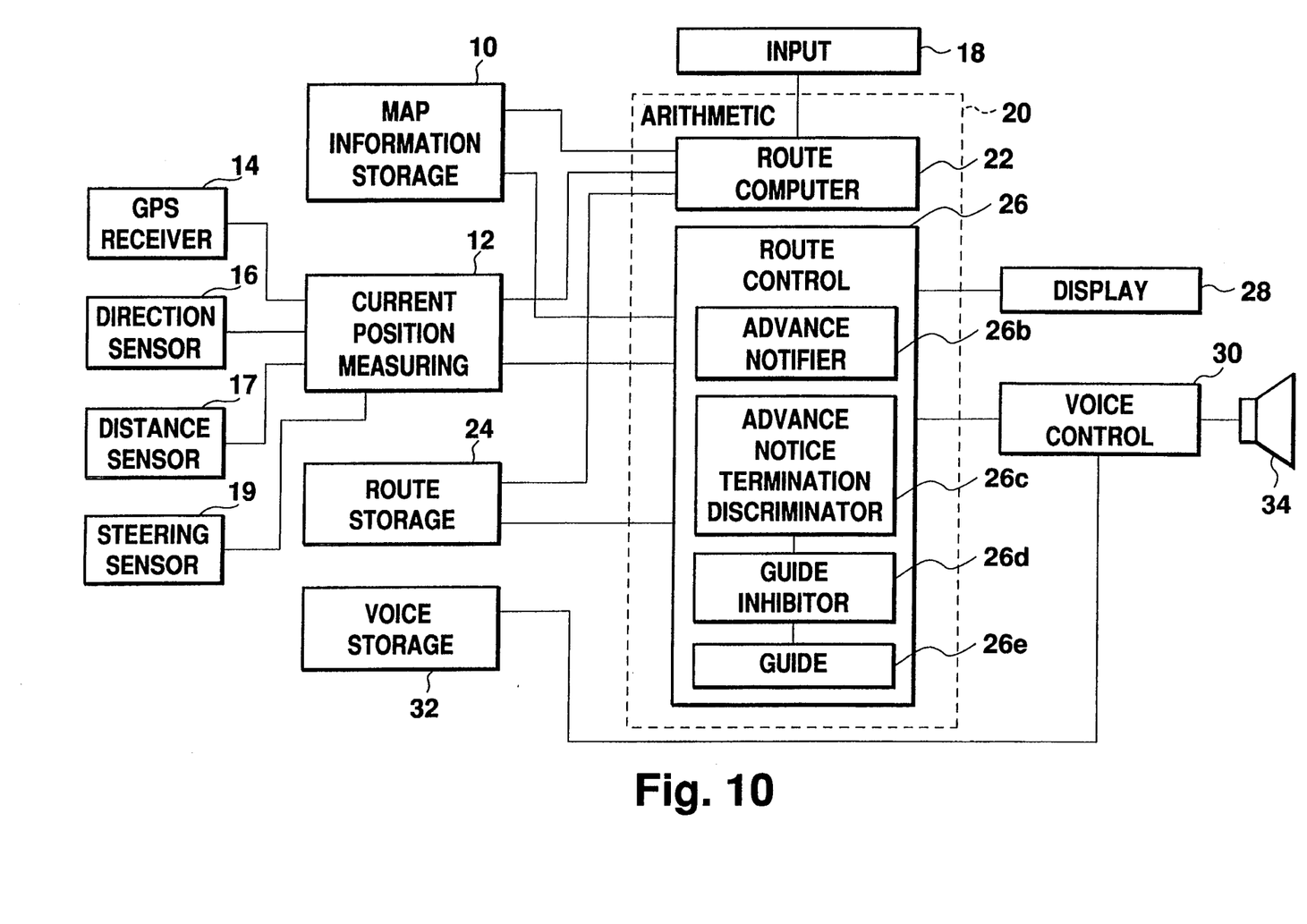
FIG. 10 is a block diagram showing another modified navigation system according to a third embodiment of the invention.
Figure 11:
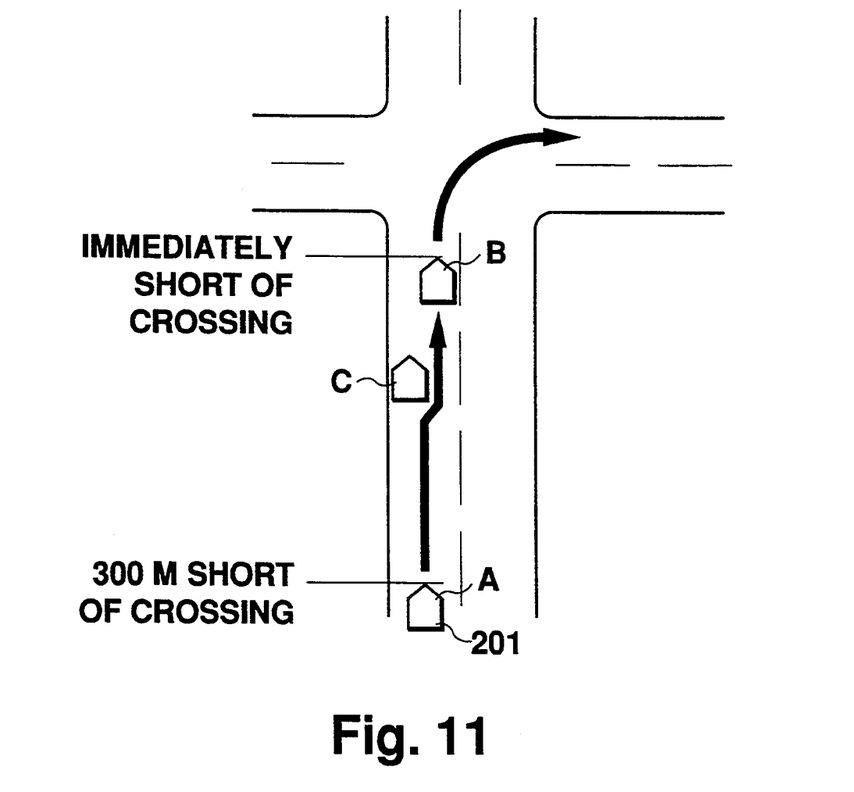
FIG. 11 is a diagram showing the operation of the system of the third embodiment when the vehicle is going to turn to the right at a crossing.

FIG. 10 shows another modified navigation system according to a third embodiment. In this embodiment, an advance notifier 26b, an advance notice termination discriminator 26c, a guide inhibitor 26d and a guide 26e are mounted in the route guiding unit 26. In FIG. 11, when the vehicle reaches a position (point A) 300 m short of the crossing where the vehicle is to turn to the right, an advance notice will be instructed by the advance notifier 26a of the route guiding unit 26. In response to this instruction, the display unit 28 and the voice control unit 30 make a display and issue voice guidance, respectively, corresponding to the advance notice. For the voice guidance, a notice "Turn to the right at the crossing 300 m ahead." is given. Hearing this advance notice, the driver moves the vehicle to the center line to prepare for turning to the right. Then when the vehicle reaches a position (B point) immediately short of the crossing, a guide notice will be instructed by the guide 26d of the route guiding unit 26 and, at the same time, the display unit 28 and the voice control unit 30 will issue the guide notice in response to the instruction. For the voice guidance, a notice "Watch out! Turn to the right soon at the crossing." is given. Then the driver makes a right turn following this notice.

In this navigation system, apart from a succession of guide notices in which route guidance takes place after an advance notice, it will be controlled so as to inhibit an aural guide notice at a position immediately short of the crossing if no advance notice has been given. For example, if the vehicle stops at a point C in FIG. 11 to make a route search and then restarts, the above-described guide notice will normally be given when the vehicle reaches a position immediately short of the crossing; in this embodiment, this aural route notice will be inhibited. In such an event, even if the driver has received the notice for right turn suddenly at a position immediately short of the crossing, it is too late to move the vehicle to the center line and, as a result, it would be difficult to make a right turn. At that time, the driver might feel as if he/she received an unsuitable notice.

For the foregoing reasons, aural route guidance is inhibited in this situation. The advance notice termination discriminator 26c discriminates whether or not an advance notice has been made by the advance notifier 26b. In the absence of any advance notice, the guide inhibitor 26d instructs the guide 26e so as to inhibit the aural route guidance. In response to this instruction for inhibition, the aural route guidance at a position immediately short of the crossing will be inhibited if no advance notice has been given. Consequently, in such event, the driver drives the vehicle according to the instruction on the display unit 28. Route guidance on the display may also be inhibited.

As described above, in the absence of an advance notice, by inhibiting the route guidance at a position immediately short of the crossing, it is possible to prevent the driver from being disturbed by an unsuitable notice.

Fourth Embodiment

Figure 12:
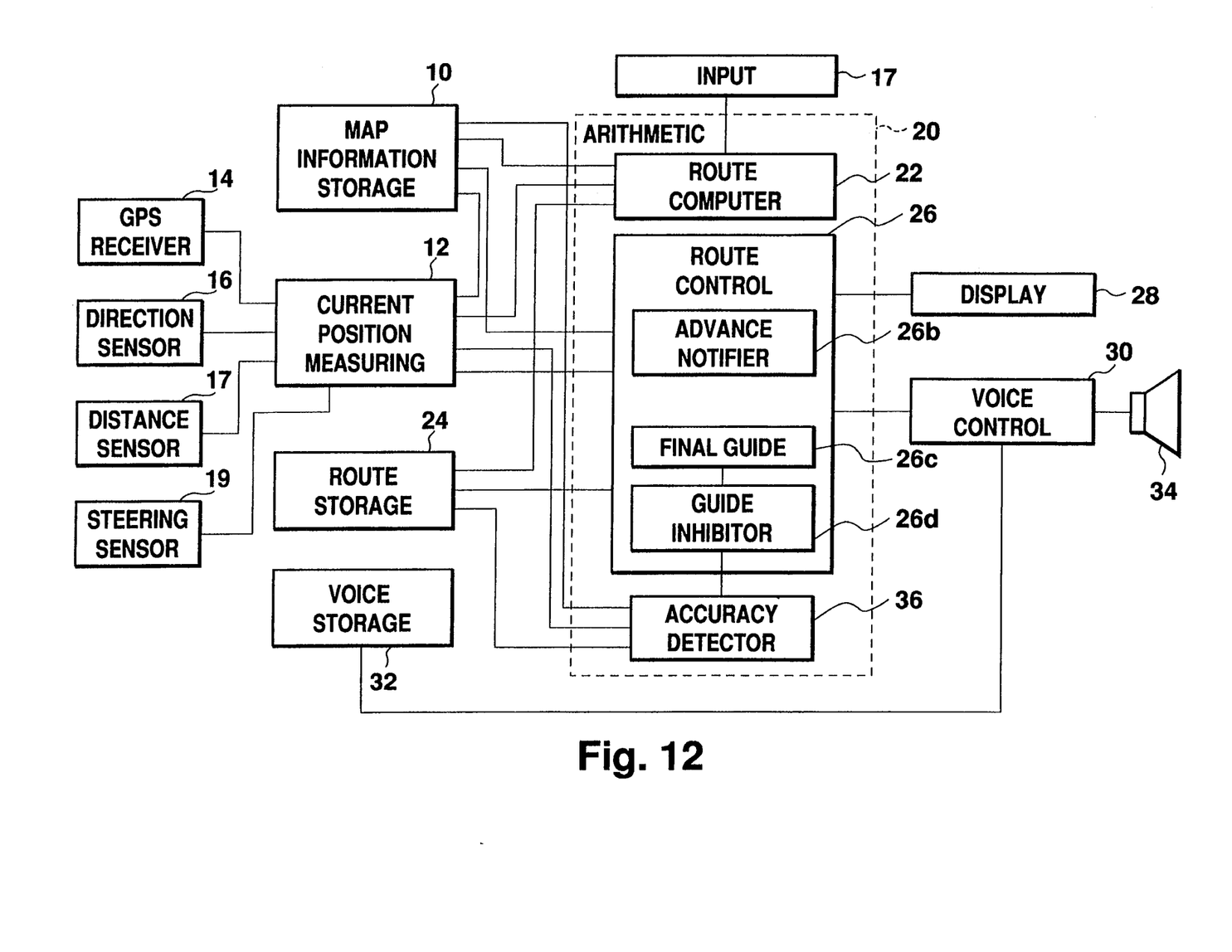
FIG. 12 is a block diagram showing still another modified navigation system according to a fourth embodiment of the invention.
Figure 13:
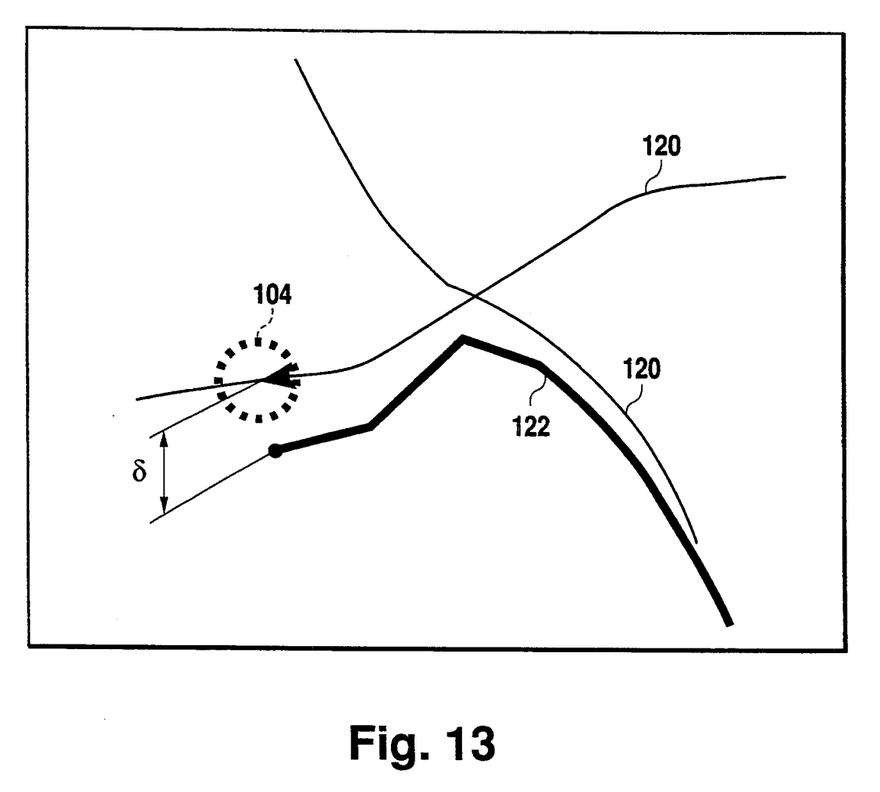
FIG. 13 is a diagram showing the operation of the fourth embodiment when a measurement error of the current position of the vehicle is made.

FIG. 12 shows still another modified navigation system according to a fourth embodiment, in which a accuracy detector 36 is mounted in the arithmetic control unit 20. In this navigation system, the accuracy detector 36 detects the degree of measurement accuracy of the current position of the vehicle, based on the road information stored in the map information storage unit 10 and the route storage unit 24. When the vehicle is off the road, the accuracy detector 36 judges the vehicle as actually traveling along the road and corrects the current position on the road, whereupon the difference between the actual current position and the measured current position will be defined as an error in the current position. For example, if the travelling locus 122 of the vehicle 14 has deviated from the road information 120 stored in, for example, the map information storage unit 10 and so the vehicle has been measured as traveling at a place where no road exists, this deviation ($\delta$) will be detected as an error of the current position. By observing this detected error all times, the accuracy detector 36 detects the current degree of accuracy.

Based on the result of detection of measurement accuracy, it will be decided whether a final notice at a position immediately short of the crossing should be inhibited or whether the contents of the notice should be changed. In this illustrated example, an advance notice is given at a position 300 m short of the crossing, and a final notice is given at a position 100 m short of the crossing. The degree of measurement accuracy of the current position of the vehicle will be less than 300 m in one case and will be at least 300 m in the other case.

If the degree of measurement accuracy is less than 300 m, an advance notice will be instructed by a advance notifier 26b of the route guiding unit 26 when the vehicle reaches at a position (point A in FIG. 14) 300 m short of the crossing where the vehicle is to turn to the right. Upon receipt of this instruction, the display unit 28 and the voice control unit 30 perform displaying and voice guidance. For the voice guidance, a notice such as "Turn to the right at the crossing 300 m ahead." will be given. Hearing this advance notice, the driver moves the vehicle to the center line to prepare for making a right turn. When the vehicle arrives at a position (point B) immediately, e.g. 100 m, short of the crossing, route guidance will be instructed by a final guide 26c of the route guiding unit 26. In response to this instruction, the display unit 28 and the voice control unit 30 issue a display and an aural notice, respectively, corresponding to the route guiding. For the voice guidance, a notice such as "Watch out! Turn to the right soon at the coming crossing." is issued by the voice control unit 30. The driver then drives the vehicle to make a right turn, following this notice.

Figure 14:
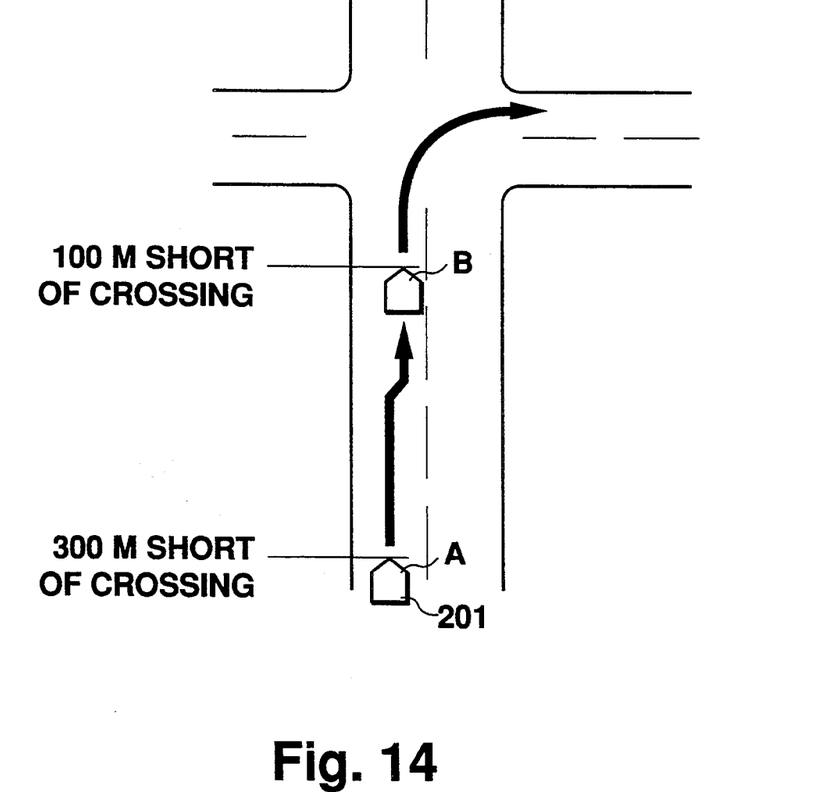
FIG. 14 is a diagram showing the operation of the fourth embodiment when a previous notice and a final notice are made when the vehicle approaches a crossing.

If the degree of measurement accuracy is at least 300 m, an inhibitor 26d will detect it and will issue to the final guide 26c an instruction for inhibiting route guidance. Therefore, after an advance notice has been given, no voice guidance will take place.

Situations may be divided into three cases in terms of degree of accuracy, e.g. less than 50 m, at least 150 m and less than 300 m, and at least 300 m. In the case of less than 150 m, the control for a final notice will be carried out after an advance notice. In the case of at least 300 m, like the foregoing case where the guide notice is inhibited, a final notice will not been given after an advance notice. In the case of at least 150 m and less than 300 m, a final notice will be issued, but it will be simply "Watch out! Turn to the left." without saying, "soon". Thus if the measurement degree of accuracy is not adequately high, it might be actually much too far to the crossing, in which event if the notice said "soon", the driver would have been misguided.

What is claimed is:

1. A vehicle navigation system comprising:
    (a) map information storage means;
    (b) route computing means for searching a route to an intended destination of a vehicle using the map information stored in said map information storage means;

(c) route guide and control means for displaying the computed route on a display screen and for outputting voice guidance via a speaker;

(d) on-off selecting means for selecting whether or not the voice guidance should be output;

(e) inhibition means for inhibiting outputting of the voice guidance if said on-off selecting means selects that the voice guidance should not be output;

(f) input means for inputting a request for outputting the voice guidance;

(g) voice guidance creating means for creating the voice guidance in response to the output request from said input means; and (h) voice guidance output means for releasing the inhibition status of said inhibition means for a predetermined period of time to output the voice guidance created by said voice guidance creating means.

2. A vehicle navigation system according to claim 1, wherein said on-off selecting means is a touch switch displayed on the screen.

3. A vehicle navigation system according to claim 1, wherein said output means serves also as a start switch to start route guidance.

4. A vehicle navigation system according to claim 1, wherein said voice guidance creating means creates the voice guidance by combining a plurality of voice phrases previously stored.

* * * * *